United States Patent [19]

Rylander

[11] Patent Number: 4,758,886

[45] Date of Patent: Jul. 19, 1988

[54] OPTIMAL COLOR HALF-TONE PATTERNS FOR RASTER-SCAN IMAGES

[75] Inventor: Richard L. Rylander, St. Paul, Minn.

[73] Assignee: Minnesota Mining and Manufacturing Company, St. Paul, Minn.

[21] Appl. No.: 889,819

[22] Filed: Jul. 24, 1986

[51] Int. Cl.$^4$ ............................................. H04N 1/46
[52] U.S. Cl. ........................................ 358/80; 358/78
[58] Field of Search ....................... 358/75, 80, 76, 77, 358/78, 79

[56] References Cited

U.S. PATENT DOCUMENTS

| | | | |
|---|---|---|---|
| 2,136,340 | 11/1938 | Hardy | 178/7.4 |
| 2,165,168 | 7/1939 | Hardy | 178/5.2 |
| 2,185,139 | 12/1939 | Wurzburg, Jr. | 178/5.4 |
| 2,185,806 | 1/1940 | Finch | 178/5.2 |
| 2,190,185 | 2/1940 | Hardy | 41/17 |
| 2,190,186 | 2/1940 | Hardy | 101/395 |
| 2,294,644 | 9/1942 | Wurzburg, Jr. | 41/17 |
| 2,413,706 | 1/1947 | Gunderson | 178/5.2 |
| 2,571,322 | 10/1951 | Yelland | 178/5.4 |
| 3,197,558 | 7/1965 | Ernst | 178/6.6 |
| 3,580,995 | 5/1971 | Klensch | 178/6.7 |
| 3,629,496 | 12/1971 | McConnel | 178/7.1 |
| 3,911,480 | 10/1975 | Brucker | 358/75 |
| 3,922,484 | 11/1975 | Keller | 178/6 |
| 3,997,911 | 12/1976 | Perriman et al. | 358/75 |
| 4,084,259 | 4/1978 | Cahill et al. | 364/900 |
| 4,193,096 | 3/1980 | Stoffel | 358/260 |
| 4,342,051 | 7/1982 | Suzuki et al. | 358/283 |
| 4,350,996 | 9/1982 | Rosenfeld | 358/75 |
| 4,419,690 | 12/1983 | Hammes | 358/75 |
| 4,439,789 | 3/1984 | Cahill | 358/256 |
| 4,443,060 | 4/1984 | Jung et al. | 350/317 |
| 4,456,924 | 6/1984 | Rosenfeld | 358/75 |
| 4,468,706 | 8/1984 | Cahill | 358/300 |
| 4,496,987 | 1/1985 | Yuasa et al. | 358/283 |
| 4,499,489 | 2/1985 | Gall et al. | 358/75 |

OTHER PUBLICATIONS

J. Opt. Soc. Am., vol. 66, No. 10, Oct. 1976, "Halftone Method with Edge Enhancement and Moire Suppression", Paul G. Roetling, pp. 985–989.

Photographic Science and Engineering, vol. 22, No. 2, Mar./Apr. 1978, pp. 89–91; "Random Nucleated Halftone Screen", Jan P. Allebach.

Journal of Imaging Technology, vol. 10, No. 5, Oct. 1984, pp. 181–185; "A New Evaluation Method of Image Quality of Digital Halftone Images Obtained by Ordered Dither Method", Hiroshi Kinoshita, Yoichi Miyake, Yusaku Tamoto and Souichi Kubo.

Proceedings of the Society for Information Display, vol. 21, No. 2, 1980, pp. 185–192; "An Optimum Algorithm for Halftone Generation for Displays and Hard Copies", Thomas M. Holladay.

Primary Examiner—James J. Groody
Assistant Examiner—Robert M. Bauer
Attorney, Agent, or Firm—Donald M. Sell; James A. Smith; Mark A. Litman

[57] ABSTRACT

Selecting proper half-tone screen systems for use with raster scanned images ensures the absence of Moire effects when using two or more color separations. Mathematical analysis provides an ensemble of screen patterns which are based on an odd/even relationship between the number of screen "lines" per repeat cell distance for combinations of screens. From this ensemble a critical selection is made of suitable screen parameters for the chosen font(s) using computer integration over repeat cell areas to show which chosen screens give invariance of white fraction with off-set distance in the two directions (horizontal and vertical). This comparison is carried out between all pairs of the required number of screens to be used.

6 Claims, 1 Drawing Sheet

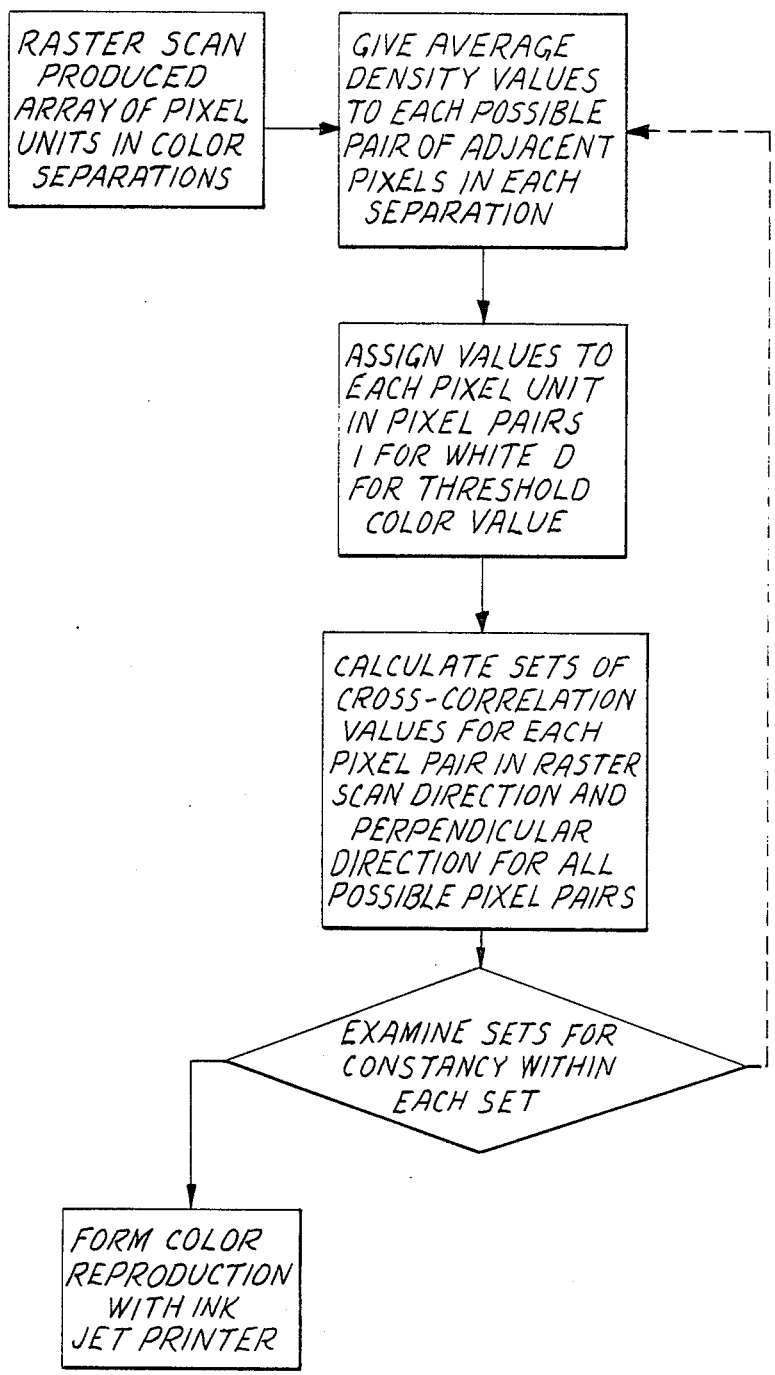

OPTIMAL COLOR HALF-TONE PATTERNS FOR RASTER-SCAN IMAGES

BACKGROUND OF THE INVENTION

1. Field of the Invention

The invention relates to the making of half-tone images of colored originals with reduced Moire effects for printing purposes. More particularly it relates to methods by which the original is scanned optically point by point and the readings obtained are converted to digital form from which the half-tone version is constructed by electronic means, often by computer. The computed half-tone signals are then presented to a printing plate or intermediate imaging material by a further scanning procedure.

Of particular importance in colored images are possible unacceptable Moire effects resulting from the use of several superimposed half-tone images for the different color separations. In the older half-tone technique where physical half-tone screens were used, these Moire patterns were reduced to imperceptible levels by crossing the screens for the several colors at specific angles whose values for three or four color printing were quite critical. This technique is not available where there are no physical screens as in laser printed images.

2. Background of the Invention

In the art of printing, half-tone systems have long been used to represent pictorial subjects where tone graduation is important. This was and frequently still is accomplished by the use of a photomechanical system in which a fine cross-hatch screen covers the pictorial image during exposure at a suitable stage in the photographic process leading to the printing plate. By this means the image is divided up into a multitude of regularly spaced very small (subliminal) dots whose size varies with the image density being reproduced. With the use of full color printing of subjects, three or four printing plates, one for each of the separate primary color images have to be prepared. The use of identical half-tone screens for each of these color separations can result in very pronounced and objectionable Moire patterns when the several successive print impressions are made. These Moire effects can be reduced to imperceptible levels by crossing the screen directions with one another. In the practice of the art it has long been known that a suitable set of screen angles for four color printing is 45°, 0°, +15°, and −15° (See reference to this art in Chapter 13 of "Principles of Color Reproduction", by J. A. G. Yule, John Wiley & Sons Inc. N.Y., 1967).

In the conventional half-tone system, the original continuous tone picture is represented in the print by regularly spaced high density dots of ink. The dots are sufficiently closely spaced that the unaided human eye cannot distinguish them. The changing size of the dots give the impression of changing tone, and by suitable control of the process the original tones can be reproduced faithfully. With full color originals, suitable control of the process of making the individual half-tone color separations can give faithful reproductions in full color. These photomechanical processes are slow and painstaking, particularly when high quality results requiring considerable manual correction and human judgement are involved.

The transmission of images over telegraph wires based on a process of photoelectric raster scanning was introduced early in the twentieth century. It was also applied to transmitting color images (U.S. Pat. Nos. 2,185,806; 2,413,706). The application of this technique to half-tone plate making by Hardy and others (U.S. Pat. Nos. 2,136,340; 2,190,185; 2,190,186; 2,294,644) heralded an era of faster and more automatic plate making and correction. Methods were developed for scanning colored originals (U.S. Pat. Nos. 2,165,168; 2,253,086; 2,571,322) and treating the readings and output by analog devices to produce color separations suitable for color printing plate making with a considerable saving in time.

The combination of these two techniques for the making of color half-tone images was found to suffer from the Moire pattern problem known earlier to photomechanical plate makers. Wurzburg (U.S. Pat. No. 2,185,139) made color half-tone separations by the photoelectric raster scanning methods, where he physically rotated both the original picture and the reproduction of the raster scanning devices to give different equivalent screen angles for the different colors. Screen angle choice was based on the photomechanical art already existing.

In the photoelectric raster scanning systems, conversion of analogue scanning signals to digital form was found to facilitate manipulation of the signals by computing circuits, as in the electronic formation of half-tone dot patterns (U.S. Pat. No. 3,629,496). Such methods gave color originals suffering from Moire patterns in the resulting prints. Patterns of dots of equal size but with separation distances depending on density in the original were found to reduce the Moire patterns (U.S. Pat. Nos. 3,197,558; 3,580,995) because of the absence of repeating patterns of dots. Direct simulation of the use in color work of four contact screens at different screen angles has been achieved by computing techniques coupled with four different dot generators (U.S. Pat. No. 3,911,480). Choice of the angles used is based on earlier experience with contact screens.

A different approach has been taken to the problems presented by photoelectric scanning methods. This involves the representation of a variable size half-tone dot by a matrix of smaller dots whose number in the matrix is varied to provide half-tone dot size changes and therefore density changes. (U.S. Pat. Nos. 3,604,486; 4,439,789). No change of size or optical density of these smaller dots is involved. Only their presence or absence is considered. This system therefore lends itself to the use of digital signals and their attendant high speed computing means. Enhanced tonal reproduction has been achieved by using a variable pixel area (the area assigned to a single matrix unit) in such matrix systems (U.S. Pat. No. 4,084,259).

In four color printing the separations have been represented by matrix pixels in which the distribution of dots for the same density is varied from one separation to another. This is said to reduce Moire effects (U.S. Pat. No. 3,922,484). This technique of Moire reduction has been expanded by randomizing the distribution of dots in the pixel matrix (U.S. Pat. No. 4,468,706) building on earlier monochrome work (U.S. Pat. No. 3,629,496).

The randomized pixel matrix method of reducing Moire effects has been approached in a separate manner often termed "ordered dither". The raster scan identifies signals corresponding to all the dot positions in the pixel matrix but the presence or absence of a dot in the reproduction is determined by a predetermined matrix of threshold values—one for each dot position in the pixel matrix (U.S. Pat. Nos. 4,193,096; 4,342,051; 4,496,987).

As was reported above, U.S. Pat. Nos. 2,185,139 and 3,911,480 describe raster scan methods to reduce Moire effects which generate half-tone screen dots with different screen angles for the different color separations. This method has been enhanced in U.S. Pat. No. 4,419,690. A variation to this method has been taught in U.S. Pat. No. 4,443,060 wherein quadratic raster meshes of adjacent dots are expanded or contracted in their two diagonal directions. Different expansions/contractions are used for the different color separations.

The non-patent literature contains considerable detailed discussion of the application of raster scanning to half-tone image production. The following papers are representative: "Half-tone Method with Edge Enhancement and Moire Suppression", P. G. Roetling, JOSA 66, 985 (1976). In this method, detail corresponding to the spatial frequency of the half-tone screens is suppressed. "Random Nucleated Halftone Screen," J. P. Allebach, PS & E 22.89 (1978). These screens suppress Moire effects by the introduction of random elements.

"An Optimum Algorithm for half-tone Generation for Displays and Hard Copies," T. M. Holladay, Proc. Soc. for Information Display, 21., 185 (1980). This describes electronically produced screens with different screen angles.

"A New Evaluation Method of Image Quality of Digital Halftone Images Obtained by Ordered Dither Method", K. Kinoshita et al., J. Imaging Technology, 10.181 (1984).

The present invention approaches the problem of Moire fringes in color half-tone images from the standpoint that the mathematical functions describing the half-tone patterns for the individual separations should be orthogonal with one another. There appears to have been no earlier disclosure of such an approach and none of the mathematical investigations in the literature suggest such an approach.

SUMMARY OF THE INVENTION

The invention provides a method of designing screen functions for raster-scan generated sets of image comprising two or more color separation images, which sets of generated images have reduced Moire patterns or are free from Moire pattern problems. The method does not use the equivalent of different screen angles for the separations nor is the technique of ordered dither used. The half-tone dot matrixes in a given separation are disposed at a single uniform pitch not at variable pitch as taught in some of the known art.

To readily understand the practice of the present invention, many of the terms used in this area of technology should be defined and understood. The term "font" was first used in imaging or printing technology to distinguish between complete sets of printing characters, either by style and/or size. Italics are, for example, a type of font, distinguishable from Gothic. With changes in technology, the use of the term font has also changed. With respect to raster-scan images, font refers to the style and size of the smallest image area, the pixel. The style and size of the pixel are determined by the number, size and arrangement of digital dots within each pixel. It is generally assumed in the use of the term font that for each of the four respective color images, there should be shared common characteristics. These common characteristics, when applied to half-toning a real image, result in a consistent half-tone texture for all tonal values.

As is well understood in the art, the pixel is the smallest area of informational content within the picture or image. The pixel is also referred to in raster-scan images as a composite of digital dots. The composites or pixels contain digital dots of a predetermined size, number and array. The periodic spacing of the centers of these pixels is determined by the screen function. The digital half-tone process produces a binary half-tone image by applying a threshold requirement periodically, the periodicity of the applied requirement corresponds to dimensions within the image. This in effect creates a mathematical half-tone screen. At each addressable point, a two-dimensional array of threshold values is used to determine if that addressable point should be made black or remain white. The period over which this threshold value is applied is determined by the screen function. The screen function may extend over several continuous tone image pixels, or may include only a fraction of a single pixel, depending upon the scale of the image and the number of pixels. The screen functions are either algebraic, numeric or mathematic representations and can have different fundamental frequencies in the X and Y dimensions. The screen functions include within themselves the frequency spectrum description of the font chosen.

When half-tone patterns are created by a raster-scan device, there must eventually be some periodicity in x and y directions. Any change in color mixing that occurs within this "longest period" cell then repeats over the print. If there is some net shift (registration) dependent color bias in this cell, the same error repeats across the image giving some global color error. A worse situation exists, if the shift does not remain constant over the image, for then the color error slowly changes from cell to cell, producing color Moire.

This invention presents a method of reducing color Moire by picking functions for the half-tone patterns that produce within each cell the same degree of color overlap regardless of the registration of the color separations Such "orthogonal" functions can be defined in small cells and in the Cartesian coordinate system so natural to the raster-scan process. The color bias in each cell is reduced to zero so that no global color error results. If there is no error within each cell, regardless of registration in each cell, there will be no slowly varying color bands produced when registration is not constant across the image.

Certain definitions are particularly useful in understanding the present invention. Cross-correlation of two mathematical functions describing the spatial array of two superimposed screen patterns is defined as the normalized summation over the whole area of the patterns of the point by point product of the two functions. Cross-correlation function is here defined as the formulaic or numerical representation of values of cross-correlation between the two screen functions as one screen function is moved relative to the other along each of the rectangular lines characterizing columns and rows of half-tone dots. Orthogonal - Two math functions are orthogonal when the cross-correlation function is a constant, including zero, for all values of displacement.

The difficulty in using such orthogonal functions is that they show ideal color mixing only for a particular combination of tones. It is necessary to keep the same basic half-tone pattern as tonal values increase or decrease to avoid texture changes in the background half-tone functions. This means that orthogonal basis functions must be chosen to be fairly robust, exhibiting similar color mixing properties for a wide range of dot sizes with the dot centers remaining in the same relative locations.

A good measure of the color mixing properties of different half-tone functions is given by the average cross-correlation function. The total area is known a priori as the relative area covered by at least two colors of ink, as for example the relative area covered by cyan ink and the relative area covered by magenta ink. The relative amounts of white, pure cyan, pure magenta, and cyan plus magenta areas (and hence the net color), are determined by measuring (or calculating) just one of these parameters. The relative pure white area can then be associated with the average cross-correlation function of the half-tone patterns. By calculating this cross-correlation for different combinations of tone values of the different colors, a fairly good idea of how the half-tone functions will perform with a real image can be obtained.

Generalized mathematical analysis along these lines shows that pairs of screen functions satisfying the requirements will be characterized by the fact that at least one screen function must have an even number of repeat distances in the cell. This criterion is not sufficient to ensure that images formed by the screen functions will be Moire free. The requirement may vary with the color densities (half tone dot size) and with the font (rules for distributing the spots within the half-tone dot matrix as the tone varies).

This invention teaches, therefore, that the choice of the optimum screen functions chosen from the ensemble given by the mathematical analysis described above, can be made by numerically evaluating the white area fraction for the cell for various registration off-sets of the two color half-tone functions. Using a computer and a simple computer program, this can be done for a number of off-sets in the two major cartesian directions x and y of the raster scan. Uniformity of the white area fraction over the range of off-sets then indicates an absence of Moire problem. The procedure is carried our for various tone level combinations of the colors using the half-tone font intended for the imaging process. When three or four screen color separations are being used, this series of calculations is carried out for each possible pair of screen patterns in the set. From these results a final choice of suitable screen functions is made.

DESCRIPTION OF THE DIAGRAMS

The FIGURE is a flow diagram of a preferred method of the present invention.

DETAILED DESCRIPTION OF THE FIGURE

The FIGURE shows a diagram of the practice of the present invention. Raster scanning generates a two-dimensional array of pixel units as color separations. The adjacent pairs of pixel units in each pair is assigned a value of 0 for white and 1 for color where the level of color (density) exceeds a threshold value. Cross-correlation values are calculated in sets for each pixel pair, both in the raster scan direction and perpendicular to the raster scan direction for all possible pixel pairs. The individual sets are examined for constancy within the set. If there is no constancy, the process is repeated. If there is constancy within the set the color separation information is used to generate the color reproduction.

DETAILED DESCRIPTION OF THE INVENTION

As was described above the choice of optimum screen functions is taken in the following major steps:
1. Select fonts and associated screen functions for the several color separations.
2. Select a finite repeat cell for each possible combination of screen functions, the cell width and height of each cell containing an even number of cyles of at least one of the two screen functions in each of the two directions (columns and rows).
3. Compute the white area fraction for each screen combination at a series of off-set values (i.e., values indicating some lack of registration), and repeat the computation for a number of tone combinations of the color separations.
4. If the white area fraction uniformity is not sufficiently good (i.e., reducing the variation in the white area fraction as the offset is varied and registration is changed, the better the color constancy), return to step 2 and select further screen functions.

The method of making a Moire-free color reproduction from a set of half-tone conversions of color separations by raster scan production of a two dimensional array of pixel units according to the present invention may be practiced by steps which comprise
(a) choosing for use with each of said color separations, one of said half-tone conversions comprising a half-tone raster font series and half-tone screen line frequencies wherein all said line frequencies for said set in the raster scan direction are different and all said line frequencies perpendicular to said raster scan direction are different,
(b) analyze through the numerical mathematical evaluation of cross-correlation functions of all possible pairs of said half-tone conversions,
(c) choose one of said possible pairs and assign individual members of said half-tone font series to give at least two average density levels with each said half-tone conversion of said one of said possible pairs,
(d) assign numerical values to all said pixel units in said one of said possible pairs, selected from 1 for pixels representing white and 0 for pixels representing color, said assignment based upon a threshold value for each pixel unit density, above which 0 is assigned and below which 1 is assigned,
(e) for said one of said possible pairs, calculate a set of cross-correlation values wherein each said cross-correlation value corresponds to a different combination of two off-sets of one said half-tone conversion relative to another said half-tone conversion in said one of said possible pairs, said two off-sets being in the raster scan direction and perpendicular to the raster scan direction, and wherein said set covers ranges of said two off-sets between positions selected from repeat positions of said one of said possible pairs in the raster scan direction and perpendicular to the raster scan direction,
(f) return to step (c) and choose another one of said possible pairs to analyze and continue with steps (d) and (e) until all said possible pairs have been calculated,
(g) examine said sets of cross-correlation values for constancy within each said set, (h) then proceed to the next step (i) according to the results found;

(i) if any of said sets is not constant return to step (a) and choose different values for said line frequencies, (ii) if all said sets are constant then use said half-tone conversions of said color separations to form said color reproduction.

THE ENSEMBLE OF SCREEN FUNCTIONS FOR STEP 2

The raster screened functions in one dimension $f_1(x)$, $f_2(x)$, etc. may be represented by rectangular pulse trains of unit amplitude, the value 0 representing a colored area and the value 1 representing a white area. For two screen functions having $a_1$ and $a_2$ complete cycles in the minimum repeat cell length L (chosen so that $a_1$ and $a_2$ have no common factor) the Fourier decomposition of the first function is given by $$f_1(x) = \frac{a_1 d_1}{L} \sum_{m=-\infty}^{\infty} \frac{\sin\left(\frac{ma_1\pi d_1}{L}\right)}{\left(\frac{ma_1\pi d_1}{L}\right)} e^{-jma_1\omega_0 x}$$

where $$\omega_0 = \frac{2\pi}{L}$$

and m is an integer, and similarly for $f_2(x)$, where $d_1$ and $d_2$ are the respective pulse widths.

The coincidence area where both functions provide color, as a function of the registration offset of the screens, t, is given by the average cross-correlation function of the two screen functions $$\overline{R_{12}}(t) = \frac{a_1 a_2 d_1 d_2}{L^2} \sum_{k=-\infty}^{\infty} \frac{\sin\left(\frac{ka_1a_2\pi d_1}{L}\right)}{\left(\frac{ka_1a_2\pi d_1}{L}\right)} \frac{\sin\left(\frac{ka_1a_2\pi d_2}{L}\right)}{\left(\frac{ka_1a_2\pi d_2}{L}\right)} e^{-jka_1a_2\omega_0 t}$$

where k is an integer and the discrete frequency components are at multiples of $\omega'_0 = a_1 a_2 \omega_0$.

The Fourier transform of the cross-correlation function is $$F\{\overline{R_{12}}(t)\} =$$

$$\left(\frac{2\pi^2}{L}\right) a_1 a_2 d_1 d_2 \sum_{k=-\infty}^{\infty} \frac{\sin\left(\frac{a_1a_2k\pi d_1}{L}\right)}{\left(\frac{a_1a_2k\pi d_1}{L}\right)} \frac{\sin\left(\frac{a_1a_2k\pi d_2}{L}\right)}{\left(\frac{a_1a_2k\pi d_1}{L}\right)} \delta(\omega - a_1 a_2 k \omega_0)$$

In the case of 50% half-tone dots $$d_1 = \frac{L}{2a_1}, d_2 = \frac{L}{2a_2}$$

and thus $$F\{\overline{R_{12}}(t)\} =$$

-continued $$\frac{4}{a_1 a_2} \sum_{k=-\infty}^{\infty} \frac{\sin\left(\frac{a_1 k\pi}{2}\right)\sin\left(\frac{a_2 k\pi}{2}\right)}{k^2} \delta(\omega - a_1 a_2 k \omega_0)$$

To make the average cross-correlation function a constant independent of t, at least one of $a_1$ or $a_2$ must be even. We then get an invariant white area fraction over the cell and therefore no Moire effect.

Two dimensional screen functions introduce considerable complexity into the analysis but we may illustrate the results by the particular case where the screen function h (x,y) is given by $$h_n(x,y) = f_n(x) \cdot g_n(y)$$

in which $f_n(x)$ has pulse width $d_n$ and $a_n$ cycles per cell length L $g_n(y)$ has pulse width $w_n$ and $b_n$ cycles per cell length L where the subscript n represents the individual color separation screens.

It can be shown that the average cross-correlation function for square waves (50% half-tone functions) for offsets u and v in the x and y direction is $$\overline{R_{12}}(u,v) =$$

$$\sum_{k=-\infty}^{\infty} \sum_{l=-\infty}^{\infty} \frac{\sin\left(\frac{ka_1\pi}{2}\right)\sin\left(\frac{ka_2\pi}{2}\right)}{k^2 a_1 a_2 \pi^2} \cdot$$

$$\frac{\sin\left(\frac{lb_1\pi}{2}\right)\sin\left(\frac{lb_2\pi}{2}\right)}{l^2 b_1 b_2 \pi^2} e^{j\omega_0(ka_1a_2 u - lb_1b_2 v)}$$

to make $R_{12}$ (u,v) constant, independent of "registration" offsets u and v, either (1) at least one of $a_1$ and $a_2$ must be even, and/or (2) at least one of $b_1$ and $b_2$ must be even.

This is a very specialized case, but provides a good staring criterion for designing two-dimensional half-tone patterns with good color mixing properties.

The general case for two-dimensional patterns becomes too complex for any closed-form expression for cross-correlation to be readily helpful. It is more practical, in general, to write a simple program to evaluate numerically the "% white area" for various registration offsets of two color half-tone functions.

Remembering that the screen functions give 0 for color areas and 1 for white, the fractional area over a cell L by M units may be calculated by the summations $$W(u,v) = \frac{1}{L \cdot M} \sum_{x=1}^{L} \sum_{y=1}^{M} h_1(x,y) \cdot h_2(x+u, y+v)$$

FIG. 1 shows an example cell for one screen function. In this case there are 24×24 sub-units in the cell. The value of W(u,v) is evaluated over the L and M values of (u,v) covering the repeat distances of the cell. Uniformity of these values over the whole range of (u,v) values indicates no color variation over the cell and hence over any combination of cells.

This has been done in the Examples below and has proven a useful tool in a more rigorous evaluation of half-tone patterns for color printing. The initial design of the patterns follows the criterion for optimum color mixing in the "square wave" case which for two color patterns each individually covering 50%, should leave 25% "white" area regardless of registration. The numerical evaluation program then helps determine how robust the patterns are, that is, how well they maintain uniform color mixing for non-50% cases. The goal is to design patterns that show a nearly constant white area for various combinations of tones independent of registration effects.

While it was shown that only one of $f_1(x)$, $g_1(y)$, $f_2(x)$, and $g_2(y)$ is required to have an even number of cycles per half-tone cell for registration independent color mixing at 50%, practical examples show the more robust patterns to be those where one of the "x" functions and one of the "y" functions have an even number of cycles per cell.

With a set of four color separations A, B, C, and D these white fraction calculations must be satisfied for all pairs of screens, AB, BC, CD, AD, BD, CA. Very effective color Moire suppression has been achieved for a real test image using 12×12 half-tone matrixes, optimized using this program.

The following examples of calculated white fractions illustrate the evaluation and selection of screen functions.

The figures representing the half-tone patterns of Examples 1-9 are shown as FIGS. 2(1) through 2(9).

Examples 1 and 2 illustrate the effects expected from identical half-tone pattern frequencies used for the pair of separations. Substantial variations in white area percentage is seen in these results. Examples 3-6 illustrate an orthogonal pair of patterns exhibiting "robustness" i.e., no change in the high uniformity of white percent as the half-tone densities are varied.

Examples 7-9 illustrate an orthogonal pair of pattens showing perfect uniformity of white percentage at 50% dot areas but significant white percent variation at other half-tone densities.

EXAMPLE 1

FIG. 2(1) Identical half-tone patterns at 50% showing potential color variation vs. registration.

| PERCENT WHITE AREA FOR X AND Y RELATIVE PATTERN DISPLACEMENTS | | | | | | | | | | | | |
|---|---|---|---|---|---|---|---|---|---|---|---|---|
| 50 | 42 | 33 | 25 | 17 | 8 | 0 | 8 | 17 | 25 | 33 | 42 | 50 |
| 42 | 36 | 31 | 25 | 19 | 14 | 8 | 14 | 19 | 25 | 31 | 36 | 42 |
| 33 | 31 | 28 | 25 | 22 | 19 | 17 | 19 | 22 | 25 | 28 | 31 | 33 |
| 25 | 25 | 25 | 25 | 25 | 25 | 25 | 25 | 25 | 25 | 25 | 25 | 25 |
| 17 | 19 | 22 | 25 | 28 | 31 | 33 | 31 | 28 | 25 | 22 | 19 | 17 |
| 8 | 14 | 19 | 25 | 31 | 36 | 42 | 36 | 31 | 25 | 19 | 14 | 8 |
| 0 | 8 | 17 | 25 | 33 | 42 | 50 | 42 | 33 | 25 | 17 | 8 | 0 |
| 8 | 14 | 19 | 25 | 31 | 36 | 42 | 36 | 31 | 25 | 19 | 14 | 8 |
| 17 | 19 | 22 | 25 | 28 | 31 | 33 | 31 | 28 | 25 | 22 | 19 | 17 |
| 25 | 25 | 25 | 25 | 25 | 25 | 25 | 25 | 25 | 25 | 25 | 25 | 25 |
| 33 | 31 | 28 | 25 | 22 | 19 | 17 | 19 | 22 | 25 | 28 | 31 | 33 |
| 42 | 36 | 31 | 25 | 19 | 14 | 8 | 14 | 19 | 25 | 31 | 36 | 42 |
| 50 | 42 | 33 | 25 | 17 | 8 | 0 | 8 | 17 | 25 | 33 | 42 | 50 |

Average % white = 25
Minimum % white = 0
Maximum % white = 50

EXAMPLE 2

FIG. 2(2) Identical half-tone patterns at different densities, still color variations.

| PERCENT WHITE AREA FOR X AND Y RELATIVE PATTERN DISPLACEMENTS | | | | | | | | | | | | |
|---|---|---|---|---|---|---|---|---|---|---|---|---|
| 22 | 22 | 22 | 17 | 11 | 6 | 0 | 6 | 11 | 17 | 22 | 22 | 22 |
| 22 | 22 | 22 | 18 | 14 | 10 | 6 | 10 | 14 | 18 | 22 | 22 | 22 |
| 22 | 22 | 22 | 19 | 17 | 14 | 11 | 14 | 17 | 19 | 22 | 22 | 22 |
| 17 | 18 | 19 | 19 | 19 | 18 | 17 | 18 | 19 | 19 | 19 | 18 | 17 |
| 11 | 14 | 17 | 19 | 22 | 22 | 22 | 22 | 22 | 19 | 17 | 14 | 11 |
| 6 | 10 | 14 | 18 | 22 | 22 | 22 | 22 | 22 | 18 | 14 | 10 | 6 |
| 0 | 6 | 11 | 17 | 22 | 22 | 22 | 22 | 22 | 17 | 11 | 6 | 0 |
| 6 | 10 | 14 | 18 | 22 | 22 | 22 | 22 | 22 | 18 | 14 | 10 | 6 |
| 11 | 14 | 17 | 19 | 22 | 22 | 22 | 22 | 22 | 19 | 17 | 14 | 11 |
| 17 | 18 | 19 | 19 | 19 | 18 | 17 | 18 | 19 | 19 | 19 | 18 | 17 |
| 22 | 22 | 22 | 19 | 17 | 14 | 11 | 14 | 17 | 19 | 22 | 22 | 22 |
| 22 | 22 | 22 | 18 | 14 | 10 | 6 | 10 | 14 | 18 | 22 | 22 | 22 |
| 22 | 22 | 22 | 17 | 11 | 6 | 0 | 6 | 11 | 17 | 22 | 22 | 22 |

Average % white = 17
Minimum % white = 0
Maximum % white = 22

EXAMPLE 3

FIG. 2(3) "Orthogonal" half-tone patterns at 50% showing ideal color mixing - no registration dependence.

| PERCENT WHITE AREA FOR X AND Y RELATIVE PATTERN DISPLACEMENTS | | | | | | | | | | | | |
|---|---|---|---|---|---|---|---|---|---|---|---|---|
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |

Average % white = 25
Minimum % white = 25
Maximum % white = 25

EXAMPLE 4

FIG. 2(4) Same orthogonal patterns as Example 3 but now for highlight densities—still good color uniformity vs. registration.

| PERCENT WHITE AREA FOR X AND Y RELATIVE PATTERN DISPLACEMENTS | | | | | | | | | | | | |
|---|---|---|---|---|---|---|---|---|---|---|---|---|
| 59 | 59 | 59 | 59 | 59 | 58 | 59 | 58 | 59 | 59 | 59 | 59 | 59 |
| 58 | 59 | 58 | 59 | 59 | 59 | 59 | 59 | 59 | 59 | 59 | 59 | 58 |
| 59 | 59 | 59 | 59 | 59 | 59 | 58 | 59 | 58 | 58 | 58 | 58 | 59 |
| 59 | 59 | 59 | 59 | 59 | 59 | 59 | 59 | 58 | 58 | 58 | 58 | 59 |
| 59 | 58 | 59 | 59 | 59 | 59 | 59 | 59 | 58 | 58 | 58 | 58 | 59 |
| 59 | 59 | 59 | 59 | 58 | 59 | 58 | 59 | 58 | 58 | 58 | 58 | 59 |
| 59 | 58 | 59 | 59 | 59 | 59 | 59 | 59 | 59 | 59 | 59 | 58 | 59 |
| 59 | 59 | 59 | 59 | 59 | 59 | 58 | 59 | 58 | 59 | 59 | 59 | 59 |
| 59 | 59 | 58 | 58 | 58 | 58 | 59 | 59 | 59 | 59 | 59 | 58 | 59 |
| 59 | 59 | 58 | 58 | 58 | 58 | 59 | 59 | 59 | 59 | 59 | 59 | 59 |
| 59 | 59 | 58 | 58 | 58 | 58 | 59 | 58 | 59 | 59 | 59 | 59 | 59 |
| 58 | 59 | 58 | 58 | 58 | 58 | 59 | 59 | 59 | 59 | 58 | 59 | 58 |
| 59 | 59 | 59 | 59 | 59 | 58 | 59 | 58 | 59 | 59 | 59 | 59 | 59 |

Average % white = 59
Minimum % white = 58
Maximum % white = 59

EXAMPLE 5

FIG. 2(5) Same patterns as Example 3 but for combined shadow/highlight densities—again, good uniformity.

| PERCENT WHITE AREA FOR X AND Y RELATIVE PATTERN DISPLACEMENTS | | | | | | | | | | | | |
|---|---|---|---|---|---|---|---|---|---|---|---|---|
| 17 | 17 | 17 | 17 | 17 | 16 | 17 | 16 | 17 | 17 | 17 | 17 | 17 |
| 16 | 17 | 17 | 17 | 17 | 17 | 17 | 17 | 17 | 17 | 16 | 17 | 16 |
| 17 | 17 | 17 | 17 | 17 | 17 | 17 | 16 | 17 | 17 | 17 | 17 | 17 |
| 17 | 17 | 17 | 17 | 17 | 17 | 17 | 17 | 17 | 17 | 17 | 17 | 17 |
| 17 | 17 | 17 | 17 | 17 | 17 | 17 | 17 | 17 | 17 | 17 | 16 | 17 |
| 17 | 17 | 17 | 17 | 17 | 17 | 16 | 17 | 16 | 17 | 17 | 17 | 17 |
| 17 | 16 | 17 | 17 | 17 | 17 | 17 | 17 | 17 | 17 | 17 | 16 | 17 |
| 17 | 17 | 17 | 17 | 16 | 17 | 16 | 17 | 17 | 17 | 17 | 17 | 17 |
| 17 | 16 | 17 | 17 | 17 | 17 | 17 | 17 | 17 | 17 | 17 | 17 | 17 |
| 17 | 17 | 17 | 17 | 17 | 17 | 17 | 17 | 17 | 17 | 17 | 17 | 17 |
| 17 | 17 | 17 | 17 | 16 | 17 | 17 | 17 | 17 | 17 | 17 | 17 | 17 |
| 16 | 17 | 16 | 17 | 17 | 17 | 17 | 17 | 17 | 17 | 17 | 17 | 16 |
| 17 | 17 | 17 | 17 | 17 | 16 | 17 | 16 | 17 | 17 | 17 | 17 | 17 |

Average % white = 17
Minimum % white = 16
Maximum % white = 17

EXAMPLE 6

FIG. 2(6) Same patterns as Example 3 for shadow densities.

| PERCENT WHITE AREA FOR X AND Y RELATIVE PATTERN DISPLACEMENTS | | | | | | | | | | | | |
|---|---|---|---|---|---|---|---|---|---|---|---|---|
| 5 | 5 | 5 | 5 | 5 | 5 | 5 | 5 | 5 | 5 | 5 | 5 | 5 |
| 6 | 5 | 5 | 5 | 5 | 5 | 4 | 5 | 4 | 5 | 6 | 5 | 6 |
| 5 | 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 6 | 5 |
| 5 | 5 | 5 | 5 | 5 | 5 | 5 | 5 | 5 | 5 | 5 | 6 | 5 |
| 5 | 5 | 5 | 5 | 5 | 5 | 6 | 5 | 6 | 5 | 5 | 5 | 5 |
| 5 | 5 | 5 | 5 | 5 | 5 | 5 | 5 | 5 | 5 | 5 | 5 | 5 |
| 4 | 5 | 4 | 5 | 6 | 5 | 6 | 5 | 5 | 5 | 5 | 5 | 4 |
| 5 | 5 | 5 | 5 | 5 | 5 | 5 | 5 | 5 | 5 | 5 | 5 | 5 |
| 5 | 5 | 5 | 5 | 5 | 5 | 5 | 5 | 5 | 5 | 5 | 5 | 5 |
| 5 | 5 | 5 | 5 | 6 | 5 | 5 | 5 | 5 | 5 | 5 | 5 | 5 |
| 6 | 5 | 6 | 5 | 5 | 5 | 5 | 5 | 5 | 5 | 5 | 5 | 6 |
| 5 | 5 | 5 | 5 | 5 | 5 | 5 | 5 | 5 | 5 | 5 | 5 | 5 |

Average % white = 5
Minimum % white = 4
Maximum % white = 6

EXAMPLE 7

FIG. 2(7) Different "orthogonal" patterns at 50%—perfect color mixing.

| PERCENT WHITE AREA FOR X AND Y RELATIVE PATTERN DISPLACEMENTS | | | | | | | | | | | | |
|---|---|---|---|---|---|---|---|---|---|---|---|---|
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |
| 25 | 25 | 25 | 25 | 25 | 25 | 25 | 25 | 25 | 25 | 25 | 25 | 25 |

Average % white = 25
Minimum % white = 25
Maximum % white = 25

EXAMPLE 8

FIG. 2(8) Same patterns as Example 7 for shadow densities—significant color variation.

| PERCENT WHITE AREA FOR X AND Y RELATIVE PATTERN DISPLACEMENTS | | | | | | | | | | | | |
|---|---|---|---|---|---|---|---|---|---|---|---|---|
| 3 | 1 | 1 | 3 | 5 | 5 | 3 | 1 | 1 | 3 | 5 | 5 | 3 |
| 3 | 1 | 1 | 3 | 4 | 4 | 3 | 1 | 1 | 3 | 4 | 4 | 3 |
| 3 | 1 | 1 | 3 | 5 | 5 | 3 | 1 | 1 | 3 | 5 | 5 | 3 |
| 3 | 1 | 1 | 3 | 4 | 4 | 3 | 1 | 1 | 3 | 4 | 4 | 3 |
| 3 | 1 | 1 | 3 | 5 | 5 | 3 | 1 | 1 | 3 | 5 | 5 | 3 |
| 3 | 1 | 1 | 3 | 5 | 5 | 3 | 1 | 1 | 3 | 5 | 5 | 3 |
| 3 | 1 | 1 | 3 | 5 | 5 | 3 | 1 | 1 | 3 | 5 | 5 | 3 |
| 3 | 1 | 1 | 3 | 4 | 4 | 3 | 1 | 1 | 3 | 4 | 4 | 3 |
| 3 | 1 | 1 | 3 | 5 | 5 | 3 | 1 | 1 | 3 | 5 | 5 | 3 |
| 3 | 1 | 1 | 3 | 5 | 5 | 3 | 1 | 1 | 3 | 5 | 5 | 3 |
| 3 | 1 | 1 | 3 | 4 | 4 | 3 | 1 | 1 | 3 | 4 | 4 | 3 |
| 3 | 1 | 1 | 3 | 5 | 5 | 3 | 1 | 1 | 3 | 5 | 5 | 3 |
| 3 | 1 | 1 | 3 | 5 | 5 | 3 | 1 | 1 | 3 | 5 | 5 | 3 |

Average % white = 3
Minimum % white = 1
Maximum % white = 5

EXAMPLE 9

FIG. 2(9) Same patterns as Example 7 for highlight densities—again, registration-dependent color shifts.

| PERCENT WHITE AREA FOR X AND Y RELATIVE PATTERN DISPLACEMENTS | | | | | | | | | | | | |
|---|---|---|---|---|---|---|---|---|---|---|---|---|
| 69 | 72 | 72 | 69 | 67 | 67 | 69 | 72 | 72 | 69 | 67 | 67 | 69 |
| 69 | 71 | 71 | 69 | 68 | 68 | 69 | 71 | 71 | 69 | 68 | 68 | 69 |
| 69 | 72 | 72 | 69 | 67 | 67 | 69 | 72 | 72 | 69 | 67 | 67 | 69 |
| 69 | 72 | 72 | 69 | 67 | 67 | 69 | 72 | 72 | 69 | 67 | 67 | 69 |
| 69 | 71 | 71 | 69 | 68 | 68 | 69 | 71 | 71 | 69 | 68 | 68 | 69 |
| 69 | 72 | 72 | 69 | 67 | 67 | 69 | 72 | 72 | 69 | 67 | 67 | 69 |
| 69 | 72 | 72 | 69 | 67 | 67 | 69 | 72 | 72 | 69 | 67 | 67 | 69 |
| 69 | 71 | 71 | 69 | 68 | 68 | 69 | 71 | 71 | 69 | 68 | 68 | 69 |
| 69 | 72 | 72 | 69 | 67 | 67 | 69 | 72 | 72 | 69 | 67 | 67 | 69 |
| 69 | 72 | 72 | 69 | 67 | 67 | 69 | 72 | 72 | 69 | 67 | 67 | 69 |
| 69 | 71 | 71 | 69 | 68 | 68 | 69 | 71 | 71 | 69 | 68 | 68 | 69 |
| 69 | 72 | 72 | 69 | 67 | 67 | 69 | 72 | 72 | 69 | 67 | 67 | 69 |
| 69 | 72 | 72 | 69 | 67 | 67 | 69 | 72 | 72 | 69 | 67 | 67 | 69 |

Average % white = 69
Minimum % white = 67
Maximum % white = 72

A particularly well-suited application of these halftone patterns has been the printing of four-color ink jet images. The specific ink jet writer used was constrained to addressing only points on a Cartesian grid (as in most raster scan devices), and the real density of available points is low. Attempts to create well-defined "classical" screen angles resulted in an extremely coarse half-tone texture, but the use of half-tone patterns as described in this patent proposal for the various colors, produced relatively "fine-grained" images without objectionable color Moire patterns.

All half-tone patterns were defined in a 24×24 dot grid. The black separation (which carries most of the image detail information) was half-toned with a pattern using a four-dot period (six cycles per unit cell). The magenta and cyan separations used half-tone functions with 3×4 and 4×3 cycles per unit cell (respectively). Finally, the yellow separation (which has the lowest visibility and generally exhibits the least problems with color Moire) was half-toned with both a fairly coarse two-cycle by two-cycle pattern and a 3×3 cycle pattern.

Both yellow patterns produced images with consistent colors throughout (no obvious color banding or Moire effects). While the 3×3 pattern might be expected to show more interference with the cyan and magenta patterns (due to the common frequency in one dimension), the yellow ink itself was fairly pure and showed little color crosstalk with the others.

I claim:

1. A method of making a Moire-free color reproduction using a number of half-tone color separations derived from color separations of an original image, comprising the steps of
   (a) choosing a series of half-tone screen functions which are described by a mathematical means selected from the group consisting of (i) mathematical functions, and (ii) numerical arrays,
   (b) selecting from said series a set of half-tone screen functions in number equal to said number of half-tone color separations, said set of half-tone screen functions being mathematically orthogonal,
   (c) using said set of half-tone screen functions together with said color separations to make said half-tone color separations, and
   (d) using said half-tone color separations to make said Moire-free color reproduction.

2. A method of making a Moire-free color reproduction from a set of half-tone conversions of color separations by raster scan production of a two dimensional array of pixel units comprising the steps of
   (a) choosing for use with each of said color separations, one of said half-tone conversions comprising a half-tone raster font series and half-tone screen line frequencies wherein all said line frequencies for said set in the raster scan direction are different and all said line frequencies perpendicular to said raster scan direction are different,
   (b) analyzing through the numerical mathematical evaluation of cross-correlation functions of all possible pairs of said half-tone conversions,
   (c) choosing one of said possible pairs and assign individual members of said half-tone font series to give at least two average density levels with each said half-tone conversion of said one of said possible pairs,
   (d) assigning numerical values to all said pixel units in said one of said possible pairs, selected from 1 for pixels representing white and 0 for pixels repesenting color, said assignment based upon a threshold value for each pixel unit density, above which 0 is assigned and below which 1 is assigned,
   (e) for said one of said possible pairs, calculating a set of cross-correlation values wherein each said cross-correlation value corresponds to a different combination of two off-sets of one said half-tone conversion relative to another said half-tone conversion in said one of said possible pairs, said two off-sets being in the raster scan direction and perpendicular to the raster scan direction, and wherein said set covers ranges of said two-sets between positions selected from repeat positions of said one of said possible pairs in the raster scan direction and perpendicular to the raster scan direction,
   (f) returning to step (c) and choose another one of said possible pairs to analyze and continue with steps (d) and (e) until all said possible pairs have been calculated,
   (g) returning examining said sets of cross-correlation values for constancy within each said set,
   (h) then proceeding to step (i) or (ii) according to the results found
      (i) if any of said sets is not constant returning to step (a) and choose different values for said line frequencies,
      (ii) if all said sets are constant then using said half-tone conversions of said color separations to form said color reproduction.

3. A method as recited in claim 1 wherein step (b) further comprises checking that all possible pairs of said line frequencies are characterized by the fact that there exist for each of said possible pairs in said raster scan direction first repeat positions, and perpendicular to said raster scan direction second repeat positions, and distances between said first repeat positions being divisible by a whole number of cycles $n_1$, of one said line frequency in said raster scan direction and by a whole number of cycles $n_2$ of the other line frequency in said raster scan direction where $n_1$ and $n_2$ are not equal, and distances between said second repeat positions are divisible by a whole number of cycles m, of one said line frequency in said raster scan direction and by a whole number of cycles $m_2$ of the other line frequency perpendicular to said raster scan direction, where $m_1$, and $m_2$, are not equal, and where at least one of said whole number of cycles is odd and at least one of said $n_1$, and $n_2$ is even and at least one of said $m_1$ and $m_2$ is even.

4. The process of claim 1 wherein said color reproduction is made by ink jet printing at least two different color inks onto a single surface.

5. The process of claim 2 wherein said color reproduction is made by ink jet printing at least two different color inks onto a single surface.

6. The process of claim 3 wherein said color reproduction is made by ink jet printing at least two different color inks onto a single surface.

* * * * *